Nov. 13, 1928.  1,691,479
H. HIORNS
ROTARY PISTON MECHANISM AND ITS APPLICATION TO VARIABLE SPEED GEARING
Filed May 11, 1925  3 Sheets-Sheet 1
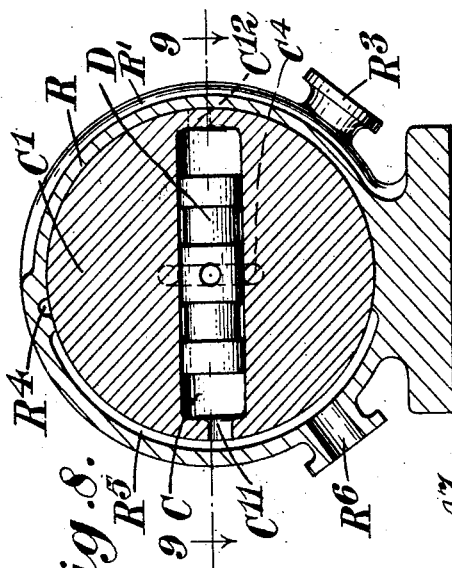
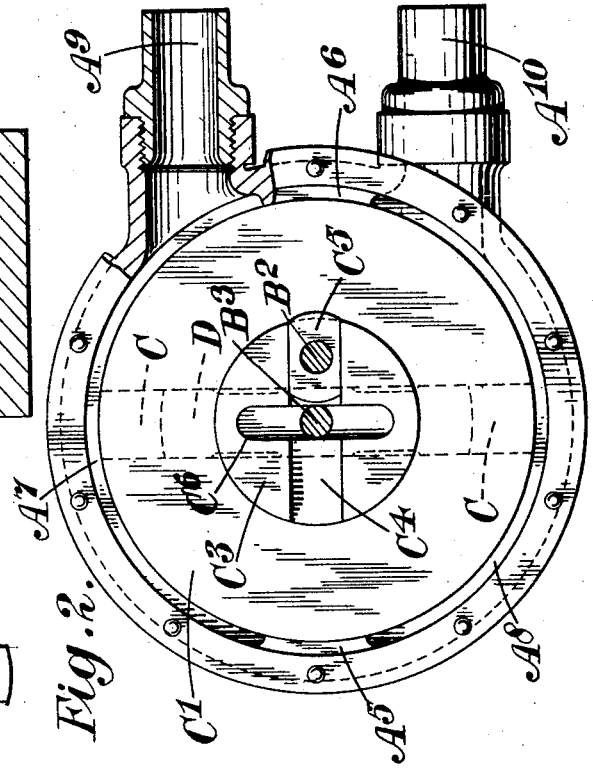
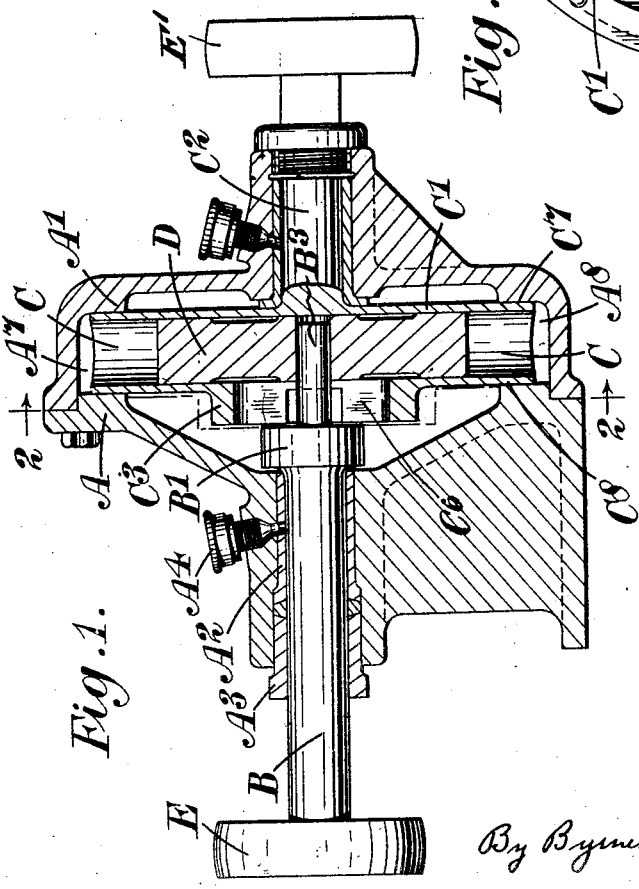
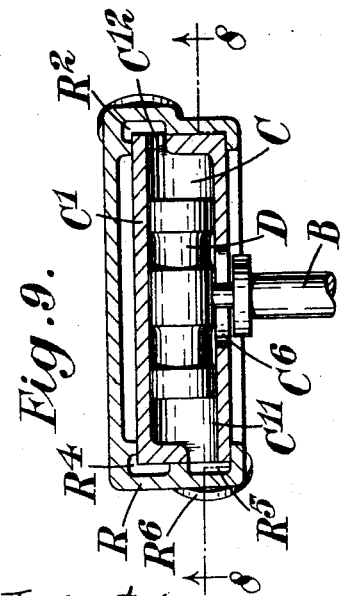
Inventor:
H. Hiorns.
By Byrnes, Stebbins & Parmelee
Attys.

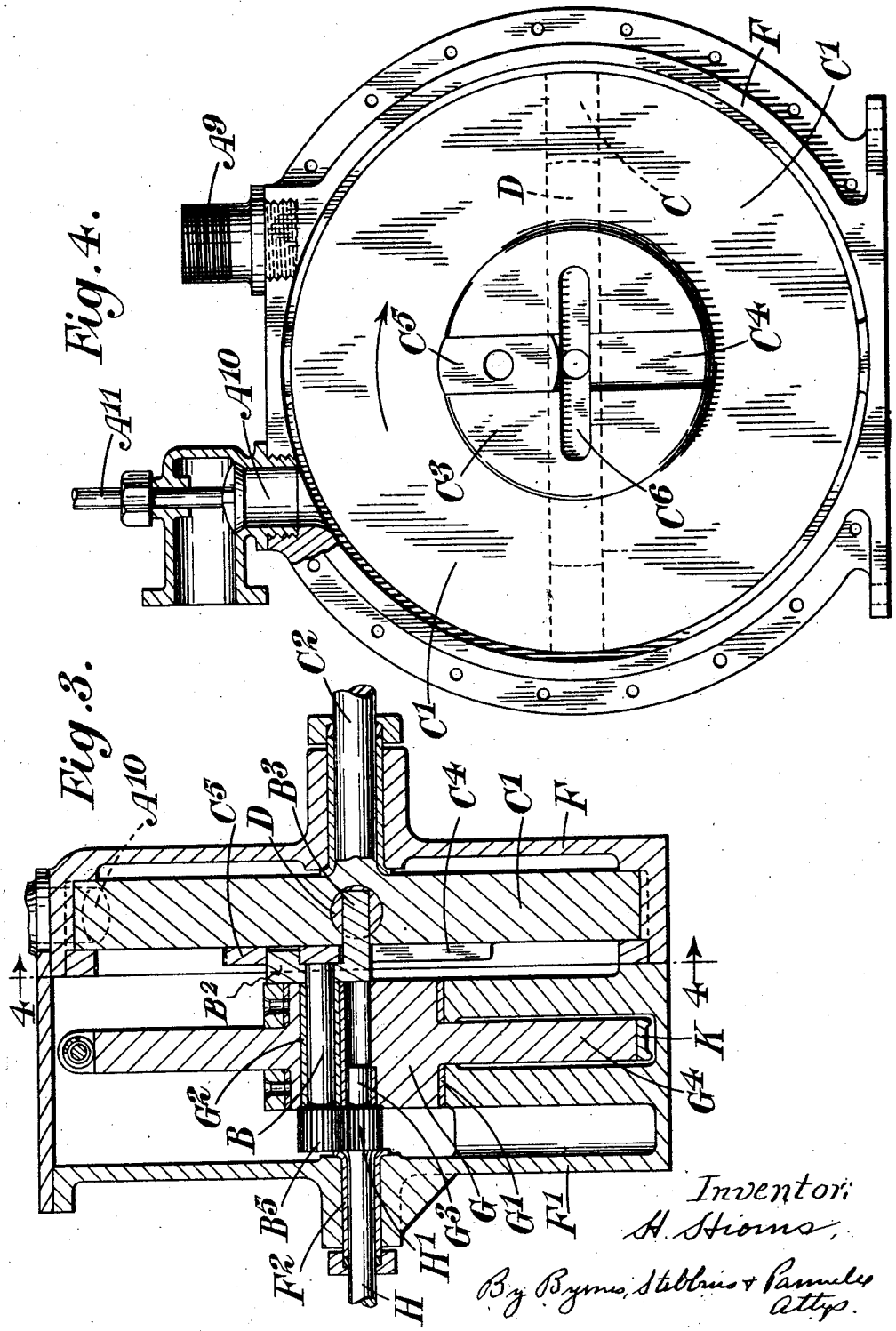

Nov. 13, 1928. 1,691,479
H. HIORNS
ROTARY PISTON MECHANISM AND ITS APPLICATION TO VARIABLE SPEED GEARING
Filed May 11, 1925  3 Sheets-Sheet 3
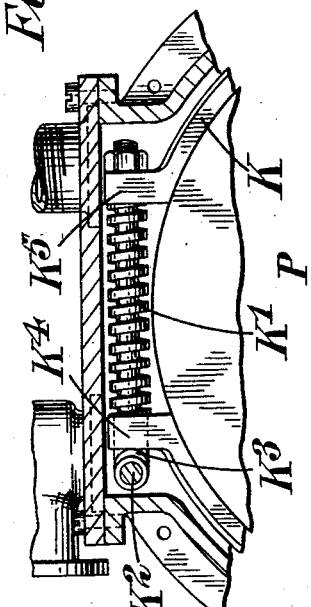
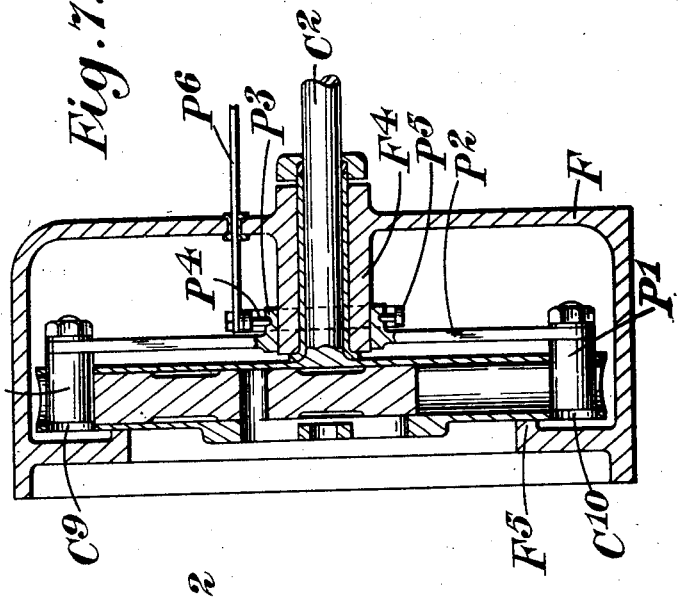
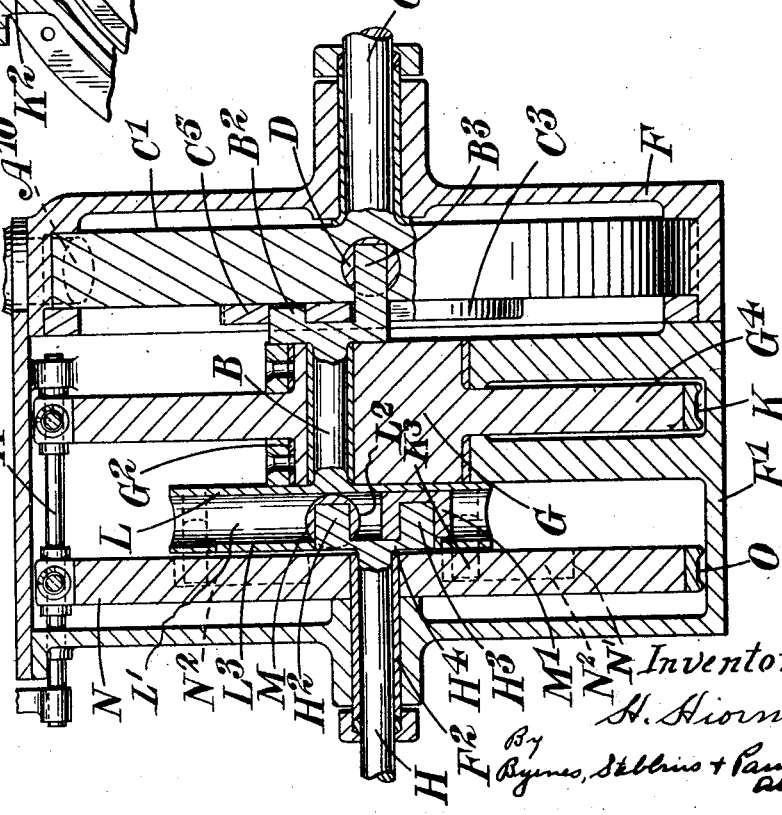

Patented Nov. 13, 1928.

1,691,479

UNITED STATES PATENT OFFICE.

HARRY HIORNS, OF TORQUAY, ENGLAND.

ROTARY PISTON MECHANISM AND ITS APPLICATION TO VARIABLE-SPEED GEARING.

Application filed May 11, 1925. Serial No. 29,466, and in Great Britain May 19, 1924.

This invention comprises improvements in or relating to rotary piston mechanism and its application to variable speed-gearing.

The mechanism to which the invention relates may be employed in various connections which include its use as a pump, a motor (for example, a steam engine, hydraulic motor or with appropriate accessory parts as an internal combustion engine) a meter, a blower, or a clutch.

According to the invention there is provided in a rotary piston mechanism the combination of a rotary element (for example a shaft) carrying a crank-pin, a hollow cylinder which is disposed with its longitudinal axis transverse to the axis of said rotary element mounted for rotation about an axis eccentric thereto and longitudinally slotted to receive the crank-pin, and a piston in said cylinder which is engaged by said crank-pin so that it may be reciprocated in the cylinder by the crank-pin. The eccentricity of the axis of the cylinder should be equal to the radius of rotation of the crank-pin and the slot should cross this axis.

It is found that the employment of a cylindrical bore in the hollow element, which receives the piston, and the forming of the piston so that it fits this cylindrical bore results in motion being transmitted between the rotary element and the cylindrically bored element with a notable absence of noise and backlash which are commonly associated with such gears when the crank pins work in rectangular grooves. This is partly due to the fact that the rectangular grooves in ordinary constructions cross one another in the same plane and the guide blocks are not well supported in passing over the crossing point. With a cylindrical bore and a piston, however, the piston is well supported throughout its whole movement, and even if more than one cylindrical bore is employed and both bores cross one another in the same plane, yet owing to the cylindrical shape the piston is satisfactorily supported at the crossing point.

Preferably the cylinder has an external enlargement on its wall which is slotted transversely to the first said slot in the plane of rotation of the crank-pin and the rotary element has a second crank-pin which works in the slot in the boss. This second slot and crank-pin ensure that there is always a positive drive between the crank-shaft and the cylinder without dead points. The crossing point of the two slots should be in the axis of rotation of the cylinder.

The invention includes a mechanism as described wherein corresponding slots are provided through opposite parts of the cylinder wall and the crank-pin extends through both slots and engages a second crank supported by a rotary member on the other side of the cylinder from the first crank with or without the provision on the cylinder of a second transversely-slotted enlargement facing the second crank and a crank and a crank-pin therefor on the second crank.

The cylinder may be mounted on or formed in a disc with the cylinder bore in the plane of the disc, the disc may have two peripheral ports communicating with the two ends of the cylinder bore and a casing be provided which fits the periphery of the disc and has ports to co-operate with the ports in the disc.

As already stated, one application of the invention is to an internal combustion engine. In one form, an internal combustion engine according to the invention comprises a rotary piston mechanism wherein the cylinder is mounted on or formed in a disc as above described and the port in the disc which communicates with one end of the cylinder lies in a plane (taken parallel to the plane of the disc) which is a different plane from that of the port which communicates with the other end of the cylinder, the casing has a pair of ports in one said plane to enable one end of the cylinder to act as a pump, an inlet port in the other said plane to receive a compressed charge from the pump and so disposed as to deliver the charge to the other (power) end of the cylinder at a point of the rotation when the piston will be approaching or close to that end of the cylinder, and an exhaust port for the power end of the cylinder, and wherein means are provided for firing the charge.

A further important application of the mechanism according to the invention is to variable speed gears. According to the invention an epicyclic variable speed-gear having a rotatable reaction member and means for clutching the reaction-member to another part of the mechanism when desired to vary the speed, is characterized by the provision of a clutch the two elements of which are constituted by the cylinder and shaft of a rotary piston mechanism as above described, and means for throttling the passage of a fluid into and out of the cylinder so as to cause the clutch to operate.

One specific form of such gear comprises the combination of a rotary element (for example a shaft) a carrier which is rotatably mounted to turn about an axis concentric with the rotary element, an intermediate driver geared with the rotary element and supported in the carrier so as to be capable of rotation about an axis eccentric to the rotary element, a crank-pin upon the intermediate driver which engages a piston in a cylinder constructed and arranged as set forth hereinabove, a second rotary element (for example a driven shaft) axially in line with the first rotary element and in operative engagement with said cylinder so as to turn therewith, means (for example a brake) for holding the carrier from rotation when desired, and adjustable means for closing the working space of the cylinder so as to throttle the passage of fluid into and out of the cylinder.

The gear between the first said rotary element (for example the driving shaft) and the intermediate driver may consist of a crank and crank pin upon the said rotary element and a diametral slot in the intermediate driver engaged by said crank-pin, with or without a second crank pin and second diametral slot transverse with the first.

There may be combined with these parts a controlling device (for example a clutch member) for the intermediate driver which is engaged with the said driver by means which permit relative lateral displacement without relative angular movement, and means (for example a brake) to hold the controlling device from rotation when desired and thus to cause the two rotary elements to move in directions opposite to one another.

Referring to the accompanying drawings:

Figure 1 is a vertical longitudinal cross-section through the piston mechanism when constructed to act as a pump;

Figure 2 is an elevation of the internal parts thereof looking in the direction 2—2 of Figure 1;

Figure 3 is a vertical longitudinal section of the mechanism of an epicyclic variable speed gear constructed in accordance with the invention;

Figure 4 is an elevation showing the internal parts looking in the direction of the arrows 4—4 of Figure 3;

Figure 5 is a detail of the control mechanism;

Figure 6 is a longitudinal sectional elevation of a modified speed gear;

Figure 7 is a detail showing a modified means of control, and

Figures 8 and 9 are diagrams indicating the arrangement when applied to form an internal combustion engine.

Referring to Figures 1 and 2, the pump consists of a casing in two halves $A$ $A^1$ and the mechanism enclosed thereby. A driving shaft B is supported in a bearing bush $A^2$ in the half A of the casing. The bearing $A^2$ is sealed against leakage of water by a stuffing gland $A^3$ and is provided with a lubricator $A^4$. Within the casing the shaft B carries a crank disc $B^1$ having two crank pins $B^2$ $B^3$ disposed diametrically opposite to one another.

A hollow cylinder C is formed diametrically across a disc $C^1$ which is supported by a stub shaft $C^2$, relatively to which the shaft B is displaced horizontally so as to be eccentric by an amount equal to the radius of the crank pins $B^2$ $B^3$. The disc $C^1$ has a boss $C^3$ on the side which faces the crank pins and this boss is slotted diametrically at $C^4$. In the slot $C^4$ works a slide block $C^5$ mounted on the crank pin $B^2$. At right angles to the slot $C^4$ is a slot $C^6$ which is cut, not only into the boss $C^3$, but also through the cylinder wall. This slot is parallel to the bore of the cylinder and the crank pin $B^3$ is made longer than the crank pin $B^2$ so that it can pass beyond the slot $C^6$ and enter the bore of the cylinder where it engages a piston D.

The disc $C^1$ makes a working fit against the casing on both faces near the periphery at $C^7$ $C^8$. The half $A^1$ of the casing is also made to fit closely against the edge of the disc at two diametrically opposite places $A^5$, $A^6$, while intermediately between these places ports $A^7$ $A^8$ are formed in the casing which are open to the periphery of the disc. The open ends of the cylinder C form ports in the periphery of the disc $C^1$ which co-operate with the ports $A^7$ $A^8$. The location of these ports is such that each of them is in communication with one end of the cylinder C during substantially the whole of one stroke of the piston. The port $A^7$ is connected to a pipe $A^9$ and the port $A^8$ to a pipe $A^{10}$. The pipes $A^9$ and $A^{10}$ act either as suction or delivery pipes, according to the direction of rotation.

In operation the rotation of the shaft B causes the disc $C^1$ to rotate at one half of the speed of the shaft B by the action of the crank pins, and the piston D makes one complete reciprocation for each revolution of the disc C (i. e. it makes two strokes). It will be seen that the shaft $C^2$ moves at only one half of the speed of the shaft B.

The shaft B may be driven in any desired manner, for example a pulley, as shown at E. Alternatively, the shaft $C^2$ may be extended as shown, and may carry a pulley $E^1$, a suitable stuffing box of course being provided on the shaft $C^2$. If the pulley $E^1$ is driven the pump will have a different capacity from that which it has by driving the pulley E at the same speed.

It will be evident that by providing both pulleys E E$^1$, or equivalent means for receiving and transmitting power to and from the shafts B and C$^2$, a transmission gear is obtained of a fixed velocity ratio. This is either a reduction gear or a speed increasing gear according as E or E$^1$ is the driver. If the mechanism is to be used simply as a transmission gear, it is unnecessary to make the cylinder C fluid-tight or to make the disc C$^1$ fit the casing.

Referring to Figures 3 and 4 which show a variable epicyclic gear, the casing F F$^1$ houses a disc C$^1$ in which works a piston D similarly to the correspondingly lettered parts in Figures 1 and 2. The piston D is reciprocated in the disc C$^1$ by means of the crank pin B$^3$ carried on a shaft B which in the present case constitutes an intermediate driver. The shaft C$^2$ will in general be the driven shaft. The shaft B which, as already pointed out, is eccentric to the shaft C$^2$ by an amount equal to the radius of its crank pins is mounted in a carrier G supported in bearings G$^1$ which are concentric with the shaft C$^2$. The bush G$^2$ in the carrier G which supports the shaft B is therefore eccentric. The shaft B extends beyond the carrier G on the side remote from the crank pins and carries a gear wheel B$^5$ which meshes with a gear wheel H$^1$ on a driving shaft H supported in a bearing F$^2$ in the casing.

The driving shaft H is concentric with the bearings G$^1$ for the carrier G and with the shaft C$^2$. It is additionally supported by a bearing G$^3$ in the carrier G.

The carrier G has a brake disc G$^4$ on it surrounded by a band brake K. The band brake is normally held in the off position by a spring K$^1$ (Figure 5) but may be applied by rotation of an operating shaft K$^2$ which brings a cam K$^3$ to bear upon the lugs K$^4$ K$^5$ at the extremities of the band K. The pipe A$^{10}$ which constitutes the delivery of the pump portion of the mechanism is provided with a valve A$^{11}$ and the two pipes A$^9$ A$^{10}$ are both connected to an oil reservoir.

In operation if the valve A$^{11}$ is open and the band brake K is applied so as to prevent rotation of the carrier G, then the intermediate driver B is rotated through the gears H$^1$ B$^5$ in the opposite direction from the shaft H at a reduced speed and the disc C$^1$ with the shaft C$^2$ is rotated by the intermediate driver B in the same direction as it is itself revolving but at one half the speed. Consequently the shaft C$^2$ rotates in the opposite direction to the shaft H at a considerable speed reduction. If the gear is used in a motor car this constitutes the reverse drive.

Release of the brake K allows the gear to rotate idly without transmitting any torque. On now gradually closing the valve A$^{11}$ resistance is offered to the reciprocation of the piston D by the crank pin B and torque in a forward direction is applied to the shaft C$^2$. If the valve A$^{11}$ is completely closed the piston D is (neglecting leakage) prevented from movement in the cylinder, the gear is locked, and the shaft H and shaft C$^2$ with all the intermediate mechanism rotate forwardly as one whole. This constitutes the direct drive for top speed in forward gear. When the valve A$^{11}$ is partly opened a certain amount of slip is allowed as with a slipping clutch which permits of the shaft C$^2$ running at a lower speed than the shaft H.

The gear illustrated in Figure 6 contains many of the same parts that are in Figures 4 and 5 and these are similarly lettered, but it differs in that the toothed gears B$^5$ H$^1$ are replaced by a cross-slotted disc L on the intermediate driver, meshing with two crank-pins H$^2$ H$^3$ on a crank-disc H$^4$ on the driving shaft H. It will be noticed that the slots L$^1$ L$^2$ in the disc L take the form of hollow cylinders and the crank-pins H$^2$ H$^3$ engage pistons M M$^1$ which work in the cylinders, but as the mechanism is simply required to transmit power without acting as a clutch the pistons and cylinders need not be fluid-tight. It is found that these hollow cylinders and pistons work more silently than do rectangular slots and slide-blocks. The cylindrical slots L$^1$ L$^2$ cross one another in the same plane and this is possible when the pistons do not have to be fluid-tight, as they can then be made short enough not to interfere with each other. This gear could be used in other connections than the one illustrated.

In the form shown in Figure 6 the disc L is provided with a controlling-member in the form of a brake-disc N supported to turn concentrically with the driving shaft H. The brake-disc N has circular recess N$^1$ in which fit discs N$^2$ engaged by pins K$^3$ on the disc L. The radius of the circular path of the pins K$^3$ is equal to the radius of the crank pins H$^2$ H$^3$ and this again is equal to the eccentricity of the intermediate driver in the carrier G. A band brake O encircles the disc N and is controlled by a cam on the rock-shaft K$^2$ in such a way that when the brake K is on the brake O is off. An eccentric L$^3$ is let into the face of the disc L and has a bearing on the edge of the crank disc H$^4$ so as to transmit side thrust between the parts. These parts are similar to the gear described in my co-pending patent application Serial No. 756,432, filed 17th December, 1924.

The operation is as follows: If the band brake O is off and brake K is on the carrier G is held from rotation, and the intermediate driver B is driven by the shaft H at one half its speed through the gear L, L¹, L², but unlike the gear illustrated in Figures 4 and 5 the direction of motion is not reversed. The intermediate driver acts as before described to turn the driven shaft C² at half its own speed, through the action of the disc C¹. The result is that the driven shaft rotates forwardly at one quarter speed. If now the valve A¹¹ is slowly closed and the brake K slowly released, the speed will be gradually brought up to that of the driving shaft, the whole gear, as before, rotating solidly as one whole when the valve is shut. Release of the valve and both brake-discs leaves the gear neutral—i. e., transmitting no torque. Applying the brake O, the brake-disc N is held from rotation and the disc L can only gyrate in a circular path parallel to itself. The effect is that the crank-pins H² H³ cause it to gyrate in the reverse direction to the driving shaft at the same speed. The carrier G is carried round with it in this movement and the crank-pins B² B³ acting on the slot C⁴ and piston D of the disc C¹ impart to the disc C¹ a movement in the same direction as the gyration of the disc L. Thus the driven shaft C² moves at half speed in the reverse direction from the shaft H.

Figure 7 indicates a modification of the piston mechanism. In this case, instead of making the casing fit the disc C¹ adjustable means are provided on the disc itself for partly or wholly closing the working space of the cylinder. In the form illustrated, the disc is made somewhat larger, and beyond the parts of the cylinder C in which works the piston D, the bore is traversed by cross-bores C⁹ C¹⁰. Plugs P P¹ fit these bores which are of sufficient diameter to allow the plugs to close the cylinder completely when fully home. The plugs are carried by a rotatable yoke P² which is slidably mounted on a boss F⁴ inside the casing F¹ and has a groove P³ to receive projections P⁴ from a stationary actuating-ring P⁵. The actuating ring is engaged by a push-rod P⁶ which passes through the wall of the casing. Thus endwise movement of the push-rod P⁶ would open or close the working space of the cylinder. The casing F¹ has an annular face F⁵ which abuts on the disc C¹ to retain the space around the disc full of oil, but this joint is not subject to pressure or therefore liable to such leakage as the joints around the disc shown in the other figures, which have to withstand oil-pressure.

Referring now to Figures 8 and 9 which indicate a form of internal combustion engine, it is to be understood that these figures are only diagrammatic and do not indicate any packing means, ignition, or other well known and necessary parts of such an engine. Figure 8 is an elevation with the casing in section along the line 8—8 of Figure 9. Figure 9 is a plan with the casing in section along the line 9—9 of Figure 8. The cylinder C in the disc C¹ is partly closed at each end, but has ports C¹¹ C¹² at each end and these ports are arranged to lie in different planes, taken parallel to the plane of the disc. The casing R has a circumferential rib R¹ which separates the ports in the casing which communicate with the port C¹² from those which communicate with the port C¹¹. An inlet port R² is provided in the plane of the port C¹² to co-operate therewith, and the port R² communicates with an intake R³. An outlet port R⁴ is also provided in the plane of the port C¹² to co-operate therewith and these ports R² R⁴ are arranged as described with reference to Figures 1 and 2 so that the end of the cylinder C which communicates with the port C¹² acts as a pump to compress the charges.

The port R⁴ is shown in Figure 9 as extending around the disc C¹ nearly to the top, where it has a lateral extension, shown also in Figure 8, which constitutes an inlet port to deliver the compressed charge to the other end of the cylinder through the port C¹¹ just as the piston D nears that end of the cylinder. Means (not shown) are provided to fire the charge after the port C¹¹ has passed the port R⁴, and after termination of the working stroke the port C¹¹ reaches the exhaust port R⁵ communicating with the exhaust pipe R⁶. Details of bearings and so forth are not shown but may be, broadly speaking, similar to those already described with reference to the other figures.

I claim:—

1. In a rotary piston mechanism the combination of a rotary element carrying a pair of crank-pins, a cylindrically bored element which is disposed with the longitudinal axis of the bore transverse to the axis of said rotary element, is mounted for rotation about an axis eccentric thereto, is longitudinally slotted to receive one of the said crank-pins, has an external enlargement on its wall which is slotted transversely to the first said slot in the plane of rotation of the crank-pins to receive the other of said crank-pins; and a piston which fits in said cylindrical bore and is engaged by the first said crank-pin so that it may be reciprocated in the cylindrical bore by the crank-pin, substantially as and for the purposes described.

2. In a rotary piston mechanism the combination of a rotary element carrying a crank-pin, a cylindrically bored element carried by a disc with the cylinder bore in the plane of the disc, said disc being disposed so that the cylindrical bore has its longitudinal axis transverse to the axis of said rotary element and said disc being mounted for rotation about an axis eccentric to the rotary element and slotted in a direction parallel with the cylindrical bore to receive the crank-pin, a piston which fits in said bore which is engaged by said crank-pin so that it may be reciprocated in the bore by the crank-pin, peripheral ports in the disc communicating with the two ends of the cylindrical bore, a casing which fits the periphery of the disc and ports in the casing to co-operate with the ports in the disc, substantially as and for the purposes described.

3. An epicyclic variable speed-gear having a rotatable reaction-member and means for clutching the reaction-member to another part of the mechanism when desired to vary the speed, characterized by the provision of a clutch the two elements of which are constituted by the cylinder and rotary member of a rotary piston mechanism having parts constructed and arranged as set forth in claim 1 and means for throttling the passage of fluid into and out of the cylinder to cause the clutch to operate.

4. An epicyclic variable speed-gear having a rotatable reaction-member and means for clutching the reaction-member to another part of the mechanism when desired to vary the speed, characterized by the provision of a clutch the two elements of which are constituted by the cylinder and rotary member of a rotary piston mechanism having parts constructed and arranged as set forth in claim 2 and means for throttling the passage of fluid into and out of the cylinder to cause the clutch to operate.

5. In an epicyclic variable speed gear the combination of a rotary torque-transmitting member, a carrier which is rotatably mounted to turn about an axis concentric with the torque-transmitting member, an intermediate driver geared with the rotary torque-transmitting member and supported in the carrier so as to be capable of rotation about an axis eccentric to the rotary torque-transmitting member, a crank-pin upon the intermediate driver, a hollow cylinder disposed with its longitudinal axis transverse to the axis of said intermediate driver mounted for rotation about an axis concentric with said torque-transmitting member, and longitudinally-slotted to receive said crank-pin, a piston in said hollow cylinder, a rotary element axially in line with the torque-transmitting member and in operative engagement with said cylinder so as to turn therewith, means for holding the carrier from rotation when desired, and adjustable means for closing the working space of the cylinder so as to throttle the passage of fluid into and out of the cylinder for the purpose described.

6. An epicyclic variable speed-gear as claimed in claim 5 wherein the gear between the rotary torque-transmitting member and the intermediate driver comprises a crank and crank-pin upon the said rotary element and a diametral slot in the intermediate driver engaged by said crank-pin.

7. In an epicyclic variable speed-gear the combination with the parts set forth in claim 5 of a controlling device for the intermediate driver which is engaged with the said driver by means which permit relative lateral displacement without relative angular movement, and means to hold the controlling device from rotation when desired and thus to cause the two rotary elements to move in directions opposite to one another.

In testimony whereof I affix my signature.

HARRY HIORNS.